Figure 1:
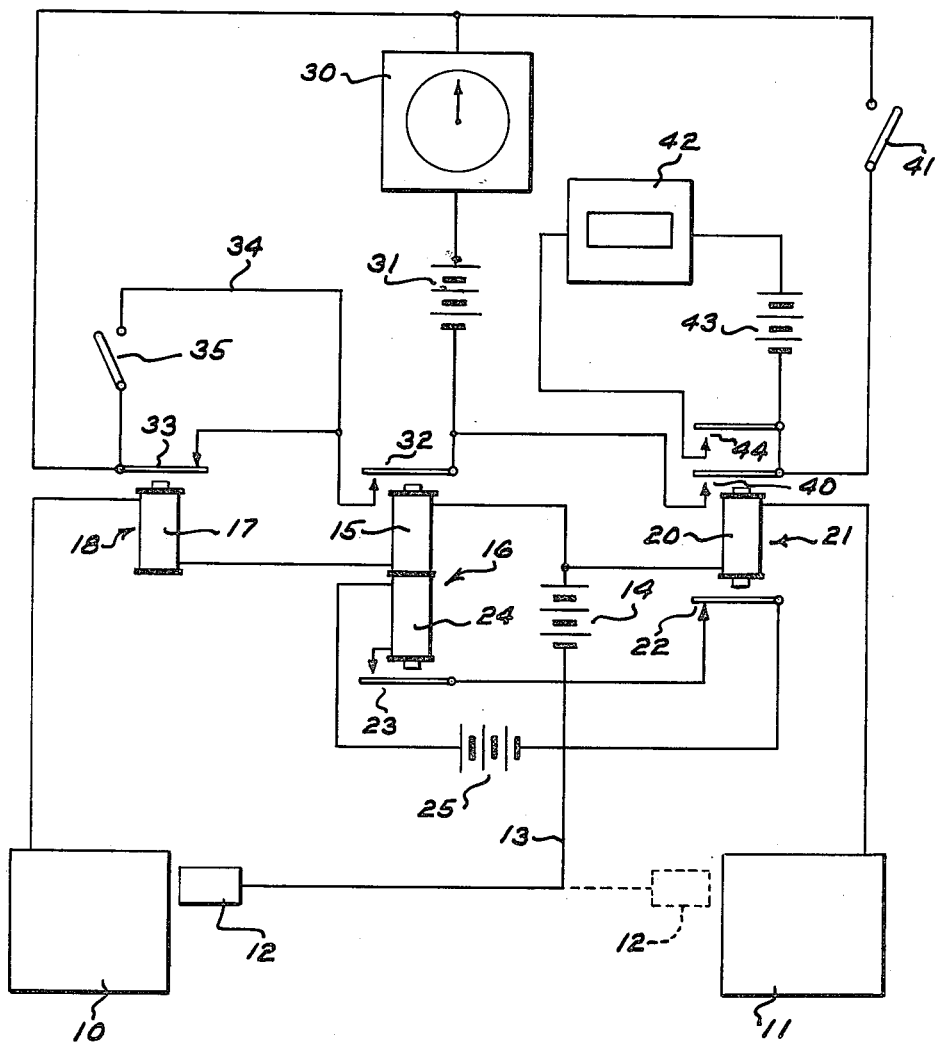

June 10, 1952   J. W. LINSLEY, JR   2,599,766
DEVICE FOR MEASURING AND COUNTING TIME INTERVALS
Filed March 8, 1950                    2 SHEETS—SHEET 1

INVENTOR
J. W. LINSLEY JR.
BY O. F. Kane
ATTORNEY

June 10, 1952     J. W. LINSLEY, JR     2,599,766
DEVICE FOR MEASURING AND COUNTING TIME INTERVALS
Filed March 8, 1950     2 SHEETS—SHEET 2

INVENTOR
J. W. LINSLEY JR.
BY
ATTORNEY

Patented June 10, 1952

2,599,766

UNITED STATES PATENT OFFICE 2,599,766

DEVICE FOR MEASURING AND COUNTING TIME INTERVALS

John W. Linsley, Jr., Chicago, Ill., assignor to Western Electric Company, Incorporated, New York, N. Y., a corporation of New York Application March 8, 1950, Serial No. 148,479

8 Claims. (Cl. 235—92)

This invention relates to time measuring apparatus and more particularly to a device for measuring and counting short time intervals.

In large manufacturing plants wherein widely varying types of work are carried out, it is sometimes desirable to determine the average length of time necessary for an employee to perform a certain work operation.

To determine the average time required for a given operation, it is advantageous to use a system of predetermined average time values which will provide specific time values for each increment of the over-all operation. In the development of an accurate system of predetermined time values, it is necessary that time data from a large number of operators be accumulated for each increment of work found in factory operations under all of the many conditions which will alter the difficulty of performing the work. In addition, a large amount of experimental time data is necessary to isolate, identify, and determine the scope of the many factors which affect the time required to perform a given work increment. Therefore, it has become necessary to develop apparatus which isolates the time required to perform a given work increment, from the operation of which it is a part, totals the increment time intervals and records the number of cycles performed so that the average time required to perform the increment of work can easily be computed.

It is an object of this invention to provide new and improved apparatus for measuring and counting time intervals of work.

In accordance with one embodiment of the invention, an electric timing and counting circuit is provided, wherein a timer and a counter are so connected, to a dummy machine or the like, that as a given work cycle is repeated, the time to perform a given work increment may be isolated from the time spent performing the balance of each work cycle and the total time spent performing the given increment accumulated for the number of work cycles recorded by the counter.

As an example of the type of work operation which may be timed and counted by this apparatus, assume that it is desired to grasp an article from a tray with a pair of tweezers and then place it within a recess provided in some type of equipment, such as a punch press die. In this case, it might be desired to isolate and determine the average time required to transport and position the article into the die having unknown positioning characteristics without disrupting the natural rhythm and work pace of the operator on the balance of the operation so that the effect of the unknown positioning factor can be measured and compared to other die recess designs. The invention, however, is not limited to use in a case such as has just been described, but may be used in conjunction with many different types of timing apparatus wherein it is desired to continuously and automatically count and time operational increments. It is further to be noted, that, in some cases, it may be desirable to only provide accurate timing summations wherein the counting feature is not desired. This invention contemplates such a requirement and, where desired, the counting operation may be eliminated.

Figure 2:
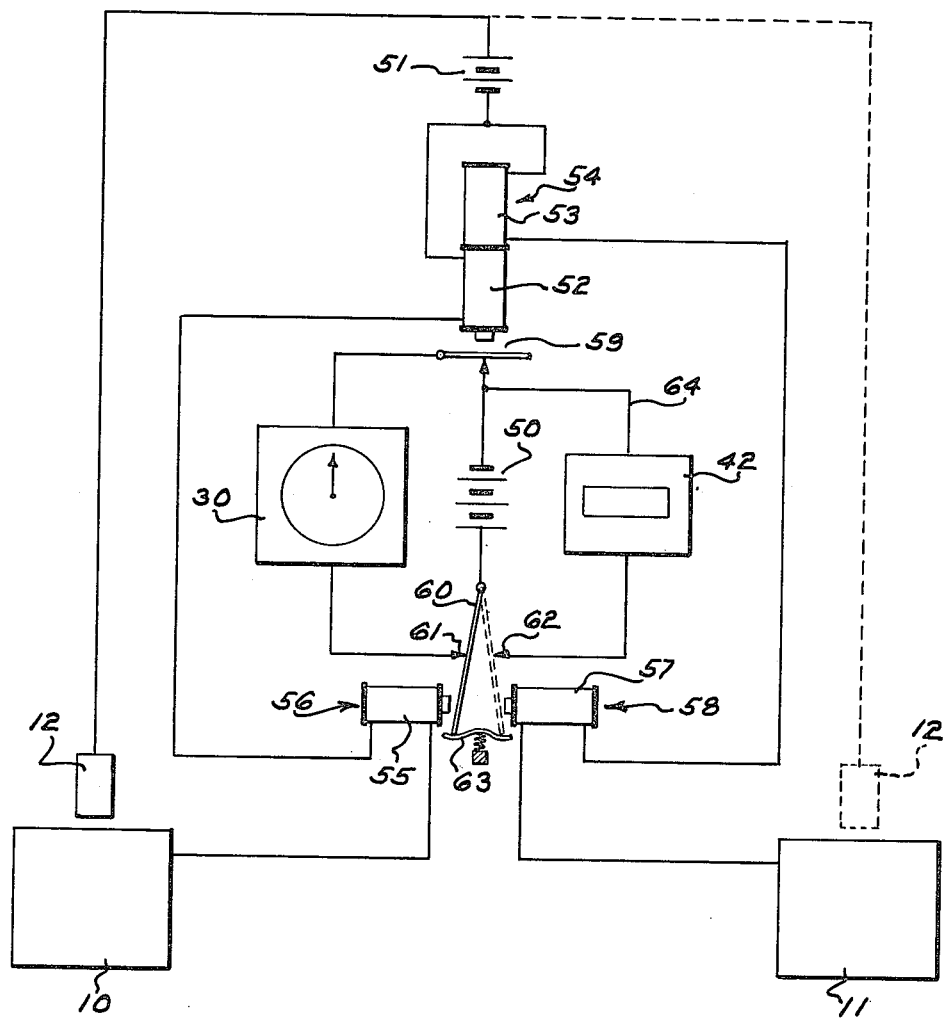

A more complete understanding of the invention may be had by referring to the following description when read in conjunction with the accompanying drawings showing two embodiments of the invention, wherein Fig. 1 is a preferred embodiment of the invention in conjunction with the accompanying drawings showing two embodiments of the invention, wherein Fig. 1 is a preferred embodiment of the invention in conventional electrical schematic form and Fig. 2 is another embodiment of the invention.

In describing the invention and its operation, it will be assumed throughout that there is a table or the like provided at the operator's position, on which table there is a starting plate 10 of electrically conducting material carrying a plurality of articles. The articles are, likewise, of electrically conducting material, and, as was explained in the example hereinbefore, it will be assumed that the particular increment of work operation to be measured consists of picking up a single article from the starting plate 10 and placing it within a recess in some type of electrically conducting equipment which is indicated as an electrically conductive destination plate 11. For purposes of actually measuring the elapsed time between the start and finish of the increment of the work operation, a pair of electrically conductive tweezers or other electrically conductive article handling means, such as electrically conducting finger contacts, is provided which, for simplicity, will hereinafter be referred to as a stylus 12.

Referring in particular to Fig. 1, the starting and destination plates 10 and 11, respectively, are adapted to be contacted by the stylus 12 at the beginning and end of the increment of the work operation. The stylus 12 is connected by a flexible connection 13 to one side of a common voltage source 14, the other side of which is connected through a first winding 15 on a double wound relay 16, and thence through a winding 17 on a relay 18 and back to the starting plate 10. The side of the common voltage source 14, opposite from the side which is connected to the stylus 12, is also connected through a winding 20 of a relay 21 to the destination plate 11. The relay 16 is provided with a set of normally open contacts 23, which contacts are serially connected through a second winding 24 on the relay 16 and through a normally closed contact 22 on relay 21 to a source of voltage 25. Thus, it will be seen that operation of contacts 23 by energization of the winding 15 causes the relay 16 to be locked in its energized position due to closure of contacts 23.

The timing and counting branches of the apparatus include an electrically operated timer 30 provided with a voltage source 31, one side of which is connected directly to the timer 30 and the other side of which is connected through a set of normally open contacts 32 on the relay 16, and a set of normally closed contacts 33 on the relay 18 to the other side of the timer. A shunt wire 34 is provided to shunt out the contacts 33 in the timer circuit by closure of a switch 35 under certain operating conditions, which will be described hereinafter. The timer voltage source 31 also has one side thereof connected through a first set of normally open contacts 40 on the relay 21, and through a switch 41 to the timer. This is an alternate circuit, the use of which will also be described hereinafter. The apparatus also includes an electrically operated counter 42, which is stepped one increment each time the counter is energized. The counter 42 is adapted to be energized by a separate voltage source 43, one side of which is connected directly to the counter, and the other side of which is connected through a second set of normally open contacts 44 on the relay 21 to the other side of the counter 42.

In the operation of the circuit shown in Fig. 1, the stylus 12 which may be any type of electrically conducting manual article handling or transporting device such as tweezers, is used by an operator who is to carry out the time standard determination. Assuming further, that the starting plate 10 consists of an electrically conducting tray or the like carrying a plurality of articles to be placed within a recess in some type of apparatus carried by the destination plate 11, the stylus 12 is operated to grip one of the articles in contact with the starting plate 10. At the instant when the stylus 12 thus effectively contacts the starting plate 10, a circuit is completed from the common voltage source 14 through the winding 15 on the relay 16, and through the winding 17 on the relay 18, thus energizing both relays 16 and 18. Assuming that the switch 35 is opened, contact of the stylus 12 with the starting plate 10 causes the contacts 33 to open and the contacts 32 to close at substantially the same instant. In actual practice, it is sometimes desirable that the contacts 32 operate slightly slower than the contacts 33 in order to insure that no time increment will be registered on the timer 30 at this time. However, for purposes of simplicity, it will be assumed that the contacts 32 and 33 are operated simultaneously. Energization of relay 16 also causes its normally open contacts 23 to be closed, thereby providing a locking circuit for the relay 16 through its winding 24, thus locking the relay 16 operated. Since in this instance it is desired to measure the time required by the operator to actually move the article from the starting plate 10 to a desired position on the destination plate 11, the circuit is so arranged, by virtue of the opened switch 35, that removal of the stylus 12 from its contact with the starting plate 10 breaks the circuit to the operating coil 17 of the relay 18, thereby allowing its normally closed contacts to assume their closed position, and thus, complete the circuit to the timer 30. The timer 30 then begins to record the time required by the operator to move the stylus 12 carrying the article into its position on the destination plate 11. Contact of the stylus 12 with the destination plate 11 causes the winding 20 on the relay 21 to be energized from the common voltage source 14. Energization of relay 21 immediately opens its contacts 22 breaking the locking circuit to the relay 16, and thereby allowing the contacts 32 on the relay 16 to open and stop the timer, assuming in this instance, that the switch 41 is in its opened position. Operation of relay 21 also closes its contacts 44, thereby causing a pulse to be fed to the counter 42 from its voltage source 43, thus actuating the counter through one increment. Removal of the stylus 12 from the destination plate 11 causes the relay 21 to be deenergized, thus allowing the contacts 44 to open and allowing the contacts 22 to close to prepare the locking circuit for the next work operation.

In the previous description of the operation of the circuit shown in Fig. 1, it was assumed throughout that the time which was to be measured was the time which elapsed from removal of an article from the starting plate 10 until its contact with the destination plate 11. In certain cases, however, it is desirable to measure the time from contact of the stylus with the article on the starting plate 10 or until its contact with the distination plate 11 has been broken. In the instance where it is desired to measure the time starting with the original contact with the starting plate 10 by the stylus 12, the switch 35 is closed, thereby shunting out the contacts 33 and causing the timer 30 to be energized solely through the contacts 32 upon contact of the stylus 12 with the starting plate 10. In cases where it is desired to measure the time up to the instant when contact of the stylus 12 with the destination plate 11 is broken, the switch 41 may be closed, thereby providing an alternate energization circuit for the timer 30 through the normally open contacts 40 on the relay 21. Thus, it will be seen, that although deenergization of the winding 24 on the relay 16 causes the contacts 32 to open, the contacts 40 are closed substantially simultaneously therewith, thus continuing the energization of the timer as desired. It is thus obvious that various combinations may be set up for measuring time intervals of work depending on the positions of the switches 35 and 41.

Referring to Fig. 2, another embodiment of the invention is shown for providing the same timing and counting measurements. In this instance, the starting plate 10, destination plate 11 and stylus 12 are similar in all respects to those described in conjunction with Fig. 1. The circuit for carrying out the measuring and counting likewise performs the operations in a manner similar to that of Fig. 1. The circuit consists of an electrically operated timer 30 and counter 42 which are adapted to be energized from a common voltage source 50. The stylus 12 is connected to one side of a separate voltage source 51, the other side of which is connected to one side of each of two parallel wound operating coils 52 and 53 on a relay 54. The other side of the operating coil 52 is connected through an operating coil 55 on a relay 56 to the starting plate 10. The other side of the operating coil 53 is connected through an operating coil 57 on a relay 58 to the destination plate 11. The timer is adapted to be energized from the common voltage source 50 through a pair of normally closed contacts 59 on the relay 54, and through a toggle arrangement including a movable toggle arm 60 connected to the side of the common voltage source opposite the contacts 59, and movable by alternate energization of relays 56 and 58 to contact fixed contacts 61 and 62, which are electrically connected to the timer 30 and counter 42, respectively. The toggle arm is of the type which remains in either of its two positions until it is actually pulled therefrom. Such an action may be provided by use of an inverted U-shaped spring 63 bearing against the free end of the toggle arm to bias it to either of its two positions. The counter 42 is connected directly through a lead 64 to the side of the voltage source 50 opposite the side connected to the toggle arm 60.

In the operation of the circuit shown in Fig. 2, assuming that it is desired to measure the time from the instant contact is broken between the stylus 12 and the starting plate 10 and the instant contact is made by the stylus 12 with the destination plate 11, the contact of stylus 12 with starting plate 10 causes the relay 54 to be energized through its operating coil 52 and causes the relay 56 to be energized through its operating coil 55. Energization of relay 54 causes the contacts 59 to be opened and causes the toggle arm 60 to be pulled into contact with the fixed contacts 61, thereby preparing the timer energization circuit for subsequent energization when the stylus 12 is removed from its contact with the starting plate 10. Removal of the stylus 12 from the starting plate 10 allows the relay 54 to be deenergized, thus allowing the contacts 59 to close, thereby starting the timer 30. The instant when the stylus 12 contacts the destination plate 11, the circuit is completed through the coil 53 on the relay 54, and through the coil 57 on the relay 58, thereby breaking the circuit to the timer at contacts 59 as well as at contacts 61. Energization of relay 58 causes the toggle arm 60 to be drawn against the contacts 62, thereby energizing the counter to cause it to step one increment. A second operation may then be carried out by again contacting the stylus 12 with the starting plate 10. It is obvious that the arrangement shown in Fig. 2 may likewise be modified to provide various other combinations of timing operations, and it is further obvious that in a situation where the counting operation is of no consequence, the counter may be entirely dispensed with.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. Apparatus for timing and counting work intervals between a start position and a destination position comprising, a timer, a counter, separate voltage sources for said timer and counter, a stylus, a contact plate at said starting position adapted to be contacted by said stylus, a common voltage source, a first and a second relay having their windings serially connected between said starting plate and stylus through said common voltage source, a set of normally closed contacts on said first relay and a set of normally open contacts on said second relay, said sets of contacts being serially connected between said timer and its voltage source, a second winding on said second relay, a voltage source therefor, a set of normally open contacts on said second relay in series with said last-mentioned winding and its voltage source to provide a locking circuit for said second relay, a contact plate at said destination position adapted to be contacted by said stylus, a third relay having its operating coil serially connected between said destination plate and said stylus through said common source, a set of normally closed contacts on said third relay connected in said locking circuit, and a set of normally open contacts on said third relay connected between said counter and its voltage source.

2. Apparatus for timing and counting work intervals between a start position and a destination position comprising, a timer, a counter, separate voltage sources for said timer and counter, a stylus, a contact plate at said starting position adapted to be contacted by said stylus, a common voltage source, a first and a second relay having their windings serially connected between said starting plate and stylus through said common voltage source, a set of normally closed contacts on said first relay and a set of normally open contacts on said second relay, said sets of contacts being serially connected between said timer and its voltage source, a second winding on said second relay, a voltage source therefor, a set of normally open contacts on said second relay in series with said last-mentioned winding and its voltage source to provide a locking circuit for said second relay, a plate at said destination position adapted to be contacted by said stylus, a third relay having its operating coil serially connected between said destination plate and said stylus through said common source, a set of normally closed contacts on said third relay connected in said locking circuit, a set of normally open contacts on said third relay connected between said counter and its voltage source, and a second set of normally open contacts on said third relay connected between said timer and its voltage source.

3. Apparatus for timing work intervals between a start position and a destination position comprising, a timer, a source of voltage therefor, a stylus, a plate at said starting position adapted to be contacted by said stylus, a common voltage source, a first relay having its winding serially connected between said starting plate and stylus through said common source, a second winding on said first relay, a source of current therefor, a set of normally open contacts on said first relay serially connected between said second winding and its source of current to provide a locking circuit for said first relay, a second set of normally open contacts on said first relay, said last-mentioned contacts being connected between said timer and its source of current, a plate at said destination position adapted to be contacted by said stylus, a second relay having its operating coil connected between said destination plate and said stylus through said common source, a set of normally closed contacts on said second relay, said last-mentioned contacts being connected in said locking circuit, and a set of normally open contacts on said second relay, said last-mentioned contacts being connected between said timer and its source of voltage.

4. A device for measuring and totalizing time intervals of work between a start position and a finish position comprising a timer, a counter, a common source of current for said timer and counter, a first relay having a pair of parallel operating coils, a source of current for said operating coils, a set of normally closed contacts under control of said first relay connected between one side of said common source and one side of said timer, a second relay having its operating coil in series with one of said parallel operating coils, a first contact plate at said start position, a movable stylus adapted to contact said first contact plate to complete the circuit through one of said first relay operating coils and said second relay operating coil, a third relay having its operating coil in series with the other of said pair of parallel coils, a second contact plate at said finish position adapted to be contacted by said stylus to energize the circuit through said other of said pair of parallel coils and said third relay operating coil, means connecting one side of the counter directly to said one side of said common source of current, and a two position toggle arm actuable by energization of said second relay operating coil to connect the other side of said common source to the other side of the timer and actuable by energization of said third relay operating coil to transfer the connection from the other side of said common source to the other side of said counter.

5. A device for accumulating and totalizing short time intervals comprising a pair of contact plates, an article handling device alternately engageable with the contact plates, a circuit closable by contact between the article handling device and one of the contact plates, a second circuit closable by contact between the article handling device and the other contact plate, a timer, a source of current, a first relay having a winding in circuit with the first contact plate energizable upon the engagement of the article handling device with the first of said contact plates, a normally open contact in series with the timer and the source of current and a normally open holding contact, and a second relay having a winding connected to the second contact plate and normally closed contacts in series with the holding contact of the first relay operable upon the engagement of the article handling device with the second contact plate for terminating the operation of the timer.

6. A device for continuously totalizing time intervals comprising a pair of contact plates, an electroconductive article handling device alternately engageable with the contact plates, a timer, a counter, a source of current having one side connected to the article handling device and the other side connected parallel to the contact plates, a relay having a winding in series with one contact plate and the source of current operable upon engagement of the article handling device with that contact plate for initiating operation of the timer, and a second relay having a winding in series with the other contact plate and the source of current operable upon engagement of the article handling device therewith for terminating the operation of the timer and feeding a pulse to actuate the counter through one interval.

7. A device for accumulating and totalizing short time intervals comprising a pair of contact plates, an electro-conductive article-handling device alternately engageable with the contact plates, a timer, a source of current having one side connected to the article-handling device and the other side connected independently to the contact plates, a relay having a winding in series with the source of current and one of the contact plates, holding contacts and normally open contacts in series with the timer, a second relay having a winding in series with the first relay winding and the source of current and normally closed contacts in series with the timer and the normally open contacts of the first relay, and a third relay having a winding in series with the other contact plate and the source of current operable upon the engagement of the article-handling device therewith and having normally open contacts in series with the timer and in parallel with the normally open contacts of the first relay, said third relay also having normally closed contacts in series with the holding contacts of the first relay, said third relay being operable upon the disengagement of the article-handling device from the second plate to terminate operation of the timer.

8. A device for totalizing time intervals, which comprises a timer, a source of current, a manually operable switch, a relay having a winding and also being provided with normally open contacts in series with the timer, the switch and the source of current, a second source of current, a starting contact plate connected to one side of the second source of current, a stylus connected to the other side of the second source of current, a starting relay having a winding in series with the stylus and second-mentioned source of current and also being provided with normally closed contacts in series with the timer and first-mentioned source of current and in parallel with the manually operable switch, a preparing relay having a winding in series with the stylus and the second-mentioned source of current and also being provided with normally open contacts in series with the timer and the first-mentioned source of current and in parallel with the first-mentioned relay contacts, means for holding the contacts of the preparing relay closed after the preparing relay winding has been energized, a second contact plate, and relay means operable by contact of the stylus with the second contact plate for opening the preparing relay contacts to stop the timer.

JOHN W. LINSLEY, JR.

REFERENCES CITED

The following references are of record in the file of this patent:

UNITED STATES PATENTS

| Number | Name | Date |
|---|---|---|
| 2,177,367 | Klopsteg | Oct. 24, 1939 |
| 2,368,761 | Hogan | Feb. 5, 1945 |